Feb. 26, 1957 D. O. NORTH 2,783,454
DATA ASSEMBLY APPARATUS
Filed Jan. 12, 1955. 2 Sheets-Sheet 1

INVENTOR.
D. O. NORTH
BY *Naylor & Lassegue*
ATTORNEYS

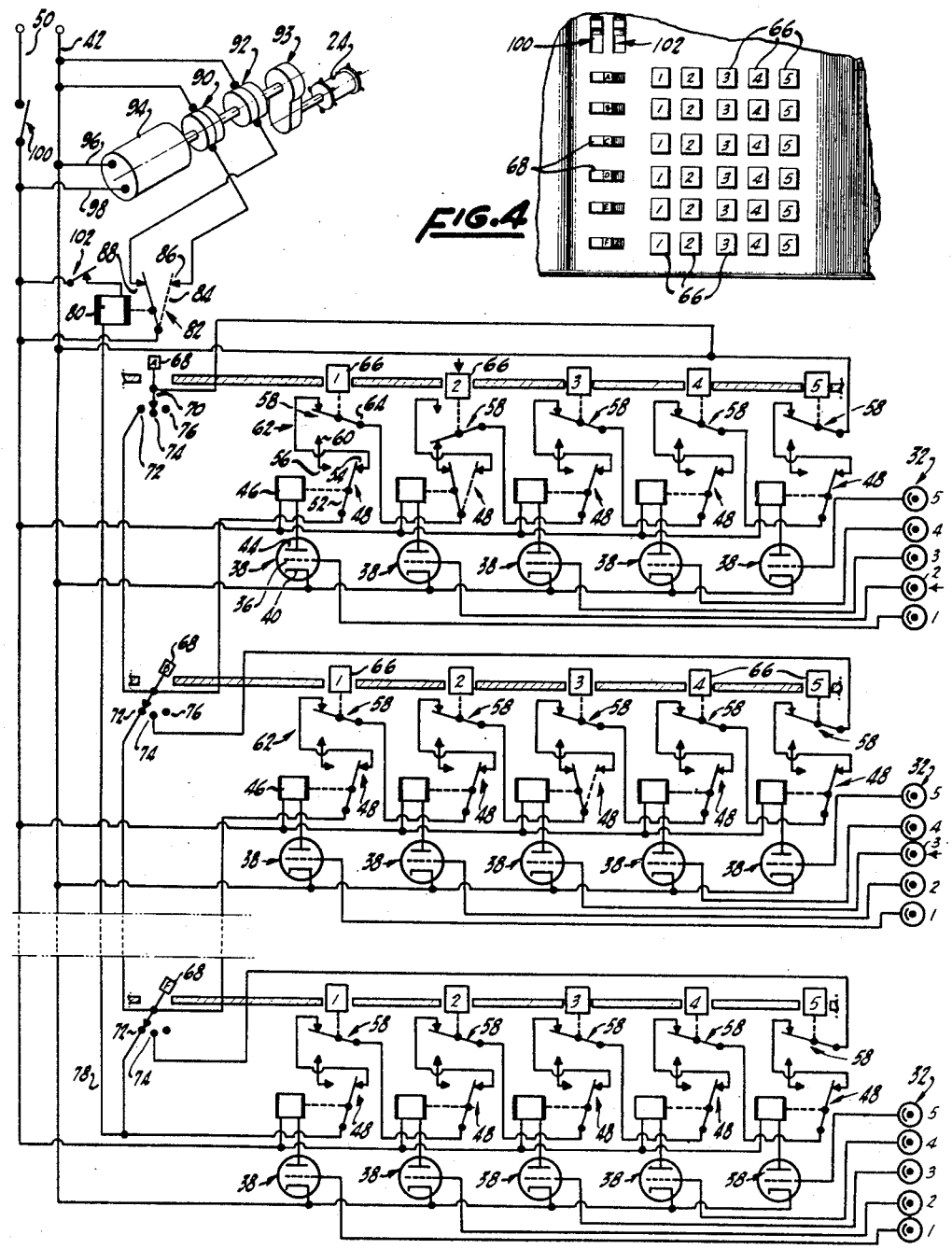

United States Patent Office 2,783,454
Patented Feb. 26, 1957

2,783,454

DATA ASSEMBLY APPARATUS

Donald O. North, Menlo Park, Calif.

Application January 12, 1955, Serial No. 481,466

3 Claims. (Cl. 340—149)

The present invention relates to improvements in data assembly apparatus, and more particularly to an improved data assembly apparatus employing a light controlled electrical circuit in the selective identification of coded-recorded information.

A principal object of the invention is to provide improved means and apparatus for use in the selective identification and/or assembly of recorded data; and, particularly applicable for use where the wanted and recorded data, records, and other information, are recorded on microfilm.

In the use of microfilm as a means for storing wanted information, there is often encountered a major task in the later locating of a frame or frames of the microfilm records on which there is recorded the information then wanted. Particularly is such true where the microfilm records include the images of many thousands of documents, as in the case of microfilm records maintained by banks, libraries, and government agencies; and this disadvantage has, in many cases, been the determinant to the adoption and use of a microfilm system of recording.

In accordance with one of the applications and embodiments of the present invention, the foregoing disadvantage to the use of microfilm is largely obviated, in a simple and economical manner, requiring but little additional expense over the initial and average cost of obtaining the microfilm records of the documents or information recorded; and, permitting of the use of microfilm in the recording and storing of wanted information in many applications where its use has heretofore been considered impractical.

Other objects, applications, embodiment and advantages of the invention will in part be apparent from the annexed drawings and in part hereinafter pointed out in the following description of such drawings.

This invention accordingly consists in the features of construction, combination of parts, and in the unique relation of the various members, all as related to the improved light controlled circuitry which, according to a principal feature of the invention, is selectively responsive to coded arrangements of light signals; as referred to above or which will be brought out and exemplified in the disclosure hereinafter set forth, including the illustrations in the various figures of the drawings, wherein:

Figure 3 is a portion of the circuit diagram of the apparatus of Figure 1; and

Figure 4 is a view along line 4—4 of Figure 1 of a portion of the keyboard of the apparatus.

As mentioned above, a principal feature of the present invention resides in the improved and simplified light controlled circuit which is selectively responsive to coded arrangements of light signals, to effect through associated apparatus the identification and/or assembly of the wanted information. In its preferred form, the invention involves first the provision with each record of wanted information of suitable means forming a code arrangement, classifying the material recorded, which when the material and code are scanned by a beam of light will produce an identifying arrangement of light signals; and second, the provision of apparatus embodying the light controlled electric circuitry above mentioned which, when the recorded information is later wanted, will cause the records thereof to be successively moved past a beam of light, and, responsive to the coded arrangements of light signals of the records then produced, will effect an identification of the selected material or information wanted.

To enable others skilled in the art to fully comprehend the underlying features of the invention, the invention is described in relation to a preferred and simplified embodiment, and it is intended and contemplated that considerable variation may be made in the method of procedure and the construction of the parts and members without departing from the spirit of the invention. In the following description and in the claims, parts and circuitry will be identified by specific names for convenience, but they are intended to be generic in their application to similar or equivalent parts as the art will permit.

Figure 2:
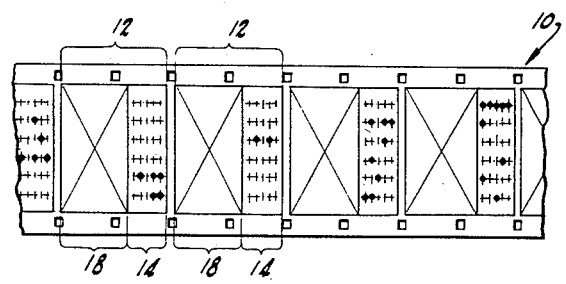
Figure 2 is a plan view of a length of microfilm recorded with which the apparatus shown in Figure 1 is employed, and showing the arrangement of each frame including the image of the material recorded and the code arrangement therefor.

Referring now to the drawings, and first to Figure 2 thereof, to locate a particular frame of microfilm 10 containing the image of a document or other data wanted, there is provided as a part of each frame 12 a code 14 which is composed of spots 16 in a predetermined pattern arranged according to the classified identity of the filmed document or article 18 of the frame.

The code 14 is a permutation type code which, by way of example, is composed of thirty possible spots 16 arranged in six rows or banks of five spots each in a different position; thus making possible for 1,073,741,823 identifications of microfilm frames or record classifications. As above mentioned, part of each frame 12 is reserved for the code 14 which may be filmed simultaneously with the microfilming of the document by the placing of a black card having white dots thereon arranged according to the code classification of the document, adjacent the document during filming. Other means for providing the codes 14 on the microfilm records will be readily apparent to those skilled in the art, and such means for providing a permutation type code may be resorted to without departing from the scope or the spirit of the invention.

Figure 1:
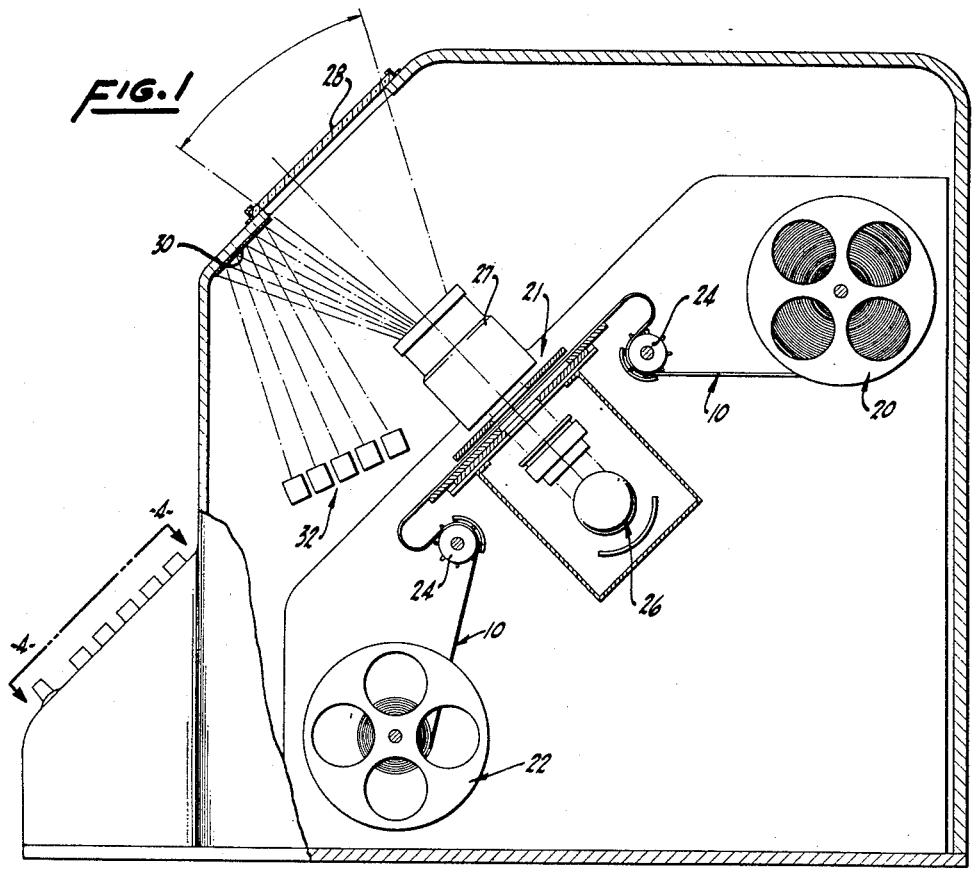
Figure 1 is a cross-sectional view in elevation through a visual data assembly apparatus for the selective identification of material recorded and coded on microfilm, according to an embodiment of the invention.

Referring now to the data assembly or identifying apparatus shown in Figure 1, the microfilm 10 is transported from a storage reel 20 past a projection station 21 to a take-up reel 22 by means of a conventional and well known Geneva mechanism, of which the drive sprockets are shown at 24.

At the projection station, as each frame 12 is intermittently moved to and stopped at the station by the Geneva drive, it is then illuminated by the lamp 26, causing the image of the filmed document 18 to be projected through the lens system 27 against the ground glass viewer 28, and the image of the code portion 14 of the frame to be projected against the mirror 30 which reflects the same back upon the bank of photoelectric cells indicated at 32. The photoelectric cells are thirty in number and are arranged corresponding to the thirty possible permutation or transparent spots of the code arrangement 14, in six rows of five cells each; whereby each photoelectric cell will be exposed to the single beam of light transmitted through the corresponding and respectively positioned transparent code spot, providing of course that such spot was exposed in the making of the code 14 for such document recorded on a given frame.

Referring now to the circuit diagram, see Figure 3, the cathode 34 of each photoelectric cell 32 is connected to the grid 36 of an amplifier tube 38. Each amplifier tube 38 in turn has its cathode 40 connected to the line 42 of the power supply, and its anode 44 connected to one side of the coil 46 of a single pole, double throw relay 48. The other side of the coil 46 of each relay is connected to the line 50 of the power supply to complete a light responsive switching circuit adapted to transfer when energized.

Connected to the armature 52 of each relay is normally closed relay contact 54, of the pair of relay contacts 54, 56 respectively. Contact 54 in turn is connected to the normally closed switch contact 58, of the pair of switch contacts 58, 60 respectively of the manually operated switch 62, which is of the single throw, double pole type. The arm 64 of each switch is adapted to transfer when actuated by a keyboard key 66; depressing the key causing the arm to break connection with the switch contact 58 and to make connection with the switch contact 60.

The thirty keys 66 of the keyboard are arranged in six rows or banks of five keys each (see Figure 4) and for each row of five code keys 66 there is provided a three position control switch or key 68. The control switch is arranged, as will be described, to (1) to complete and include in the complete code identification circuit, the code identifying circuit provided by the respective single bank of five photoelectric cells 32; (2) by-pass, in the complete code identification circuit, the code identifying circuit provided by the respective single bank of five photoelectric cells 32; and (3) reset any of the depressed code keys 66 of the respective bank of code keys controlled by the key 68.

The circuit-arrangement for code identification for each of the respective banks of keys is as follows:

In the "first bank," identified in Figures 3 and 4 with the control key 68 (A), the arm 64 of the switch 62, operated by the key 66 (5), is connected to the line 42 of the power supply; and the armature 52 of the respective relay 48, controlled by the photocell 32 (5), is connected to the arm 64 of the switch 62, operated by the key 66 (4). The armatures 52 of the relays 48 controlled by the photocells 32 (4), 32 (3) and 32 (2) are connected to the arms 64 of the switches 62 operated by the keys 66 (3), 66 (2) and 66 (1), respectively. Completing the circuit of the "first bank," the contact arm 70 of the control key 68 (A) is connected to the line 42 of the main power supply; and the armature 52 of the relay 48 controlled by the photocell 32 (1), and the contact point 72 of the switch 68 (A) are each connected to the contact arm 70 of the control key 68 of the next bank, here identified as 68 (B). The contact point 74 of the switch 68 (A) is unconnected.

At this point it is well to note that the contact point 76 of each of the switch or control keys 68 is unconnected; and that suitable linkage (not shown) of well known type is employed in relation to each of the switch keys 68 and their respective five keys 66, adapted to reset the key or keys 66 which have been depressed, when the contact arm 70 is moved to contact with the contact point 76.

Each of the circuit-arrangements operated through the "second" through "six" banks of keys, respectively, are identical; are arranged and connected successively in series through the connection of the relay armature 52 controlled by the photocell 32 (1) with the switch arm 70 of the control switch or key 68 of the next following bank; and, as will be observed (see particularly the circuit-arrangement of the "second bank" identified with the control keys 68 (B)) differ from the circuit-arrangement of the "first bank" as above described only in that: The switch arm 64 controlled by the key 66 (5) of such successive banks is connected directly to the contact point 74 of the respective control switch 68, rather than to the contact point 74 or direct to the line 42 of the power supply; and, in the last or "sixth bank," identified with the control key 68 (F), the armature 52 of the relay 46 controlled by the photocell 32 (1) is connected to the contact point 72 of the control key 68 (F), and by the lead 78 to one side of the coil 80 of a single pole, double throw relay 82.

The other side of the relay coil 80 is connected to the line 50 of the main power supply, as is the armature 84. The armature 84 is normally closed to the contact 86, of the pair of relay contacts 86, 88 (although the armature 84 is presently shown in Figure 3 in closed contact with contact 88 corresponding to the code circuit to be described hereinafter). The contact 86 is connected to one side of a magnetic type clutch, indicated at 90, of well known type; and the contact 88 is connected to one side of a magnetic type brake, indicated at 92, also of well known type. Both the clutch 90 and brake 92 are, in turn, connected to the line 42 of the main power supply.

The film sprocket 24 of the Geneva drive is driven by the gearing of the Geneva drive mechanism indicated generally at 93, which is of conventional construction and operation (commonly employed in movie projectors); and the Geneva drive gearing is, in turn, driven by the electric motor 94 through the arrangement of the clutch 90 and brake 92. The motor 94 is connected by leads 96 and 98 to the lines 42 and 50, respectively, of the main power supply.

A main control switch 100 is inserted in the line 50; and a manual switch 102 of the normally closed type is provided to enable the operator to break the circuit to the coil 80 of the relay 82, after such circuit is completed as will be described by a code identification made of a particular frame 12 of the microfilm records 10. A further switch (not shown) may also be provided, located on the keyboard, and controlling the circuit to the lamp 26 which, while not shown, is connected to the lines 42, 50 of the power supply as to be controlled also by the switch 100.

The operation of the device will now be described:

As mentioned hereinbefore, each frame 12 of the microfilm record 10 is classified and assigned a code (such as is commonly practiced in most libraries), and each number or letter of the code so assigned is identified with a permutation spot or spots 16 on the code portion 14 of the frame 12 (see Figure 2).

When it is desired to locate a particular frame (or frames), the operator depresses the key or keys 66 on the keyboard identified with each number or letter of the code assigned to the information wanted.

As will be observed from Figure 2, the circuit arrangement of each bank of keys 66 and their associated photocells 32 (hereinafter referred to in the specification and claims as a "bank circuit-arrangement") are arranged to be included in series in the circuit-arrangement to the coil 80 of the relay 82 (hereinafter referred to in the specification and claims as the "code identifying circuit-arrangement") by their respective control switches 68. When all of the keys 66 of a given bank of keys are in their normal or undepressed positions, the circuit of the bank is completed through the normally closed contact 54 and armatures 52 of the relays 48—see by example the bank circuit-arrangement identified with the control switch 68 (B) in Figure 3 (although in Figure 3 such bank circuit is actually by-passed in the code identifying circuit by the positioning of such switch 68 (B) in contact with 72). When a key 66 is depressed, the circuit of the bank is routed through the normally open contact 56 of the relay 48 associated with such depressed key 66, necessitating the activation of the relay in order to complete the circuit of the bank—see by example the bank circuit-arrangement in Figure 3 identified with the control switch 68 (A) wherein key 66 (2) is depressed and the associated relay 48 actuated by a beam of light on the photocell 32 (2) to complete the circuit of the bank. When a code circuit has been established by depressing the selected identifying key or keys 66 on the keyboard, the circuit to the coil 80 of the relay 82 will be open at one or a plurality of points in series corresponding to each depressed key 66 of the respective bank circuits inserted in series in the code identifying circuit; and the armature 84 of the relay will be in its normally closed contact position with point 86, completing the circuit to the clutch 90 and effecting a drive of the Geneva drive mechanism 93 by the motor 94. As the microfilm frames 12 are, accordingly, intermittently moved to and stopped at the projecting station 21 by the Geneva drive mechanism, the conventional shutter mechanism thereof opens and the lamp 26 projects in code arrangement a beam or beams of light which are reflected back on the photocell 32. When a frame is moved into position at the projection station 21, having a code arrangement corresponding to that set upon the keyboard, the code arrangement of the projected beams of light will cause current to flow in the respective photocells 32; activating the relays 48 controlled by the said photocells 32, and closing the relay contacts 56 thereof; completing the circuit to the coil 80 of the brake-clutch relay control 82; and closing the relay contact 88 which opens the circuit to the clutch 90 and closes the circuit to the brake 92, interrupting the drive of the sprockets 24 of the Geneva drive 93.

It will be readily understood, the action, or as it may appear, reaction of the selected code identifying circuitry imposed in the circuit to the coil 80 of the relay 82 will be substantially simultaneous with projection of the beams of light in their code arrangement upon the photocells 32; and such that the clutch-brake arrangement imposed in the drive between the electric motor 94 and the conventional Geneva drive mechanism indicated at 93, will immediately stop the microfilm 10 when a particular frame 12 is so identified, even though the microfilm is being moved at a quite rapid rate. This provides for the very rapid scanning and identification of the selected information wanted from the microfilm records.

When a particular frame has been identified and movement of the microfilm halted, as above described, the image of the recorded document of the frame identified is projected against the ground glass screen 28 where it is viewed by the operator.

To again start the drive or movement of the microfilm past the projection station 21, the operator then opens the normally closed contact of switch 102, which temporarily opens the circuit to the coil 80 of the relay 82 and permits the armature 84 to return to its normally closed position with contact 86, opening the circuit to the brake 92 and closing the circuit to the clutch 90. As the microfilm is then, accordingly, moved by the clutch-on, brake-off drive arrangement, the code identification circuit provided by the respective bank circuit-arrangements open the circuit to the coil 80, such that the operator may permit the switch 102 to return to its normal closed position; and the microfilm will be continuously moved past the projection station 21 until a further frame identification is made.

According to the foregoing description of the circuit arrangements of the invention, certain points and advantages not hereinbefore described may be noted.

Since a beam of light falling on a photoelectric cell 32 will cause current to flow in its circuit and thus effect an activation of its associated relay 48 in the manner described, it will be seen that with each of the bank circuit arrangements connected in series in the code identifying circuit, an identification of a frame will not be made should such frame happen to incorporate in a portion of its code arrangement the code arrangement of a particular frame wanted and for which the keyboard has been set. This is due to the fact that the code arrangement of the first said frame will provide, in addition to the beams of light which happen to be arranged according to the selected arrangement to which the code identifying circuit set by the keyboard will be responsive, other beams of light which complete its code arrangement; the said other beams; in causing as described current to flow in the respective photocells, activating the respective associated relay 48, and opening the circuit.

The foregoing arrangement described is particularly advantageous where the data assembly device is to be employed in the locating of wanted information or data according to a classification contained within a classification. In such case, the codes are assigned to the documents recorded by the microfilm according to several code classifications, as well as to an identification of the frame itself. For example, the frame per se may be identified by a code which would correspond to a setting of a key or keys to one or more of the separate banks of keys; the remaining banks of keys being used to select a code corresponding to a separate code applied accordingly in the corresponding code portion of the frame 12. Thus when it is later necessary to locate merely the particular frame 12, the respective code keys 68 are set in their by-pass position with contact 72, such that only the circuits of the respective banks corresponding to the frame location classification are included in the identifying circuit.

Alternatively, the reverse of the foregoing procedure may be resorted to when it is desired to locate recorded information according to a general information classification, rather than a particular frame or frames. Numerous other code arrangements and embodiments in this respect may also be resorted to, which will be readily apparent to those who have need for a means for the selective identification of wanted information contained on microfilm records, which information must be classified according to several different codes or at least more than one code corresponding to particular requirements.

A further feature which may be mentioned, though it is not specifically illustrated in the drawings, is the adaptability of the device for use where the wanted information, when identified, is to be separately reproduced from the microfilm frame. In such application, means may be provided including switch controls on the keyboard, which permit the operator, on viewing an identified frame, to cause a projection of the image of the document by means of a suitable lens system on to a selenium plate, as for example of the type used today in the zerographic process of dry printing as disclosed in United States Patent No. 2,357,809, dated September 12, 1944, to C. F. Carlson, entitled "Electro-Photographic Apparatus."

Without further analysis the foregoing is believed to so fully reveal the gist of this invention that others can by applying current knowledge readily adopt it for various applications without omitting certain features that, from the standpoint of the prior art, thoroughly constitute essential characteristics of the generic or specific aspects of this invention and therefore such adaptations should and are intended to be comprehended within the meaning and range of equivalency of the following claims.

I claim:

1. In a device for the selective identification of recorded information, said recordings each being provided with means forming a code arrangement classifying the information and adapted when exposed to a beam of light to produce an identifying arrangement of light signals: the selectively responsive light controlled circuit-arrangement including a plurality of bank circuit-arrangements, each bank circuit arrangement comprising a plurality of photoelectric cells arranged to be exposed to a corresponding bank of light signals of the identifying arrangement of light signals, a separate photoelectric cell being provided corresponding to each signal station of the total arrangement of light signals which may be employed in relation to each bank for the identification of recorded information, a separate relay controlled by each of the said photo-electric cells, and a separate manually controlled switch associated with each of said relays; the circuit-arrangements of each of the switch-relay arrangements being in series in the circuit of said bank circuit-arrangement, and so arranged that when the switch is selectively operated, the circuit of the bank circuit-arrangement will be opened, and whereupon exposure of the respective photo-electric cell will cause the relay to close the circuit of the bank circuit-arrangement, through a circuit of the circuit-arrangement of the said switch-relay arrangement, the circuit-arrangement of each relay-switch arrangement being such that the circuit of the bank circuit-arrangement is normally closed through a circuit of the relay-switch circuit arrangement when the respective switch has not been selectively operated, and is opened by the relay of the said relay-switch arrangement when the respective photo-electric cell is exposed to a light signal, and manually operated switch means adapted with respect to the circuits of each of the respective bank circuit-arrangements to selectively include the circuit of a bank circuit-arrangement in series in the circuit of the said selective responsive light controlled circuit-arrangement or to bypass the circuit of such bank circuit-arrangement therefrom.

2. A device for the selective identification of recorded information, said recorded information forming a code arrangement of a plurality of rows of spots, each said row having at least one spot, and adapted when exposed to a beam of light to produce an identifying arrangement of light signals corresponding to said rows and the position of each said spots in said rows comprising: a plurality of banks of light responsive switching circuits equal in number to said rows, each said bank corresponding to a separate said row of said spots and having separate light responsive switching circuits adapted to transfer when energized and equal in number to and responsive to said spots in said rows, respectively; a plurality of banks of manually operated switches adapted to transfer when actuated and equal in number to said banks of light responsive switching circuits, said manually operated switches of said banks each respectively connected in series with a different one of said light responsive switching circuits to create a pair of series connected switches when the transfer action of said switches of each pair are matched; said series connected pairs of switches of each said bank being connected in series; said banks of series connections being connected in series; and means for selectively bypassing each of said banks of series connections.

3. A device as recited in claim 2 and further comprising means connected to be responsive to said series of connected banks.

References Cited in the file of this patent

UNITED STATES PATENTS

| | | |
|---|---|---|
| 784,393 | Grabosch | Mar. 7, 1905 |
| 2,074,392 | Herbst | Mar. 23, 1937 |
| 2,121,061 | Townsend | June 21, 1938 |
| 2,124,906 | Bryce | July 26, 1938 |
| 2,294,734 | Bryce | Sept. 1, 1942 |
| 2,700,756 | Estrems | Jan. 25, 1955 |